United States Patent
Hirata et al.

(10) Patent No.: US 8,894,793 B2
(45) Date of Patent: Nov. 25, 2014

(54) METHOD AND SYSTEM FOR MANUFACTURING LIQUID CRYSTAL DISPLAY DEVICE

(75) Inventors: Satoshi Hirata, Ibaraki (JP); Seiji Umemoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/532,951

(22) Filed: Jun. 26, 2012

(65) Prior Publication Data

US 2013/0037205 A1 Feb. 14, 2013

(30) Foreign Application Priority Data

Aug. 9, 2011 (JP) .................. 2011-173832

(51) Int. Cl.
- *B32B 37/12* (2006.01)
- *B32B 38/18* (2006.01)
- *G02F 1/1333* (2006.01)
- *B32B 37/18* (2006.01)
- *B32B 37/02* (2006.01)
- *B32B 38/00* (2006.01)

(52) U.S. Cl.
CPC .......... *G02F 1/1333* (2013.01); *G02F 2202/28* (2013.01); *B32B 2457/202* (2013.01); *B32B 38/0004* (2013.01); *B32B 38/18* (2013.01); *B32B 37/185* (2013.01); *B32B 37/02* (2013.01)
USPC .......... 156/247; 156/249; 156/297; 156/299; 156/300; 156/324; 156/538; 156/555

(58) Field of Classification Search
USPC .................. 156/247, 249, 297, 299, 300, 324
See application file for complete search history.

(56) References Cited

U.S. PATENT DOCUMENTS

| 2005/0016670 A1 | 1/2005 | Kanbara et al. |
| 2006/0124248 A1 | 6/2006 | Kanbara et al. |
| 2009/0052032 A1* | 2/2009 | Ito et al. ........................ 359/500 |
| 2009/0218049 A1 | 9/2009 | Kanbara et al. |

FOREIGN PATENT DOCUMENTS

| EP | 2 293 271 A1 | 3/2011 |
| JP | 2005-037417 A | 2/2005 |
| JP | 2009-271516 A | 11/2009 |
| WO | WO 2009125684 A1 * | 10/2009 |

* cited by examiner

*Primary Examiner* — Margaret Squalls
(74) *Attorney, Agent, or Firm* — Westerman, Hattori, Daniels & Adrian, LLP

(57) ABSTRACT

A method for manufacturing a liquid crystal display device by feeding carrier films from continuous rolls, respectively, and by bonding optical films, which are being peeled off or have been peeled off from the carrier films, respectively, to first and second panel surfaces of a liquid crystal panel, respectively, with a pressure-sensitive adhesive interposed therebetween so that the liquid crystal display device is obtained. The method includes: a first bonding step including bonding a first optical film to the first panel surface; a rotation step including rotating the liquid crystal panel; a second bonding step including bonding a second optical film to the first optical film; and a third bonding step including bonding a third optical film to the second panel surface of the liquid crystal panel.

3 Claims, 6 Drawing Sheets

METHOD AND SYSTEM FOR MANUFACTURING LIQUID CRYSTAL DISPLAY DEVICE

BACKGROUND OF THE INVENTION

1. Field of the Invention

The invention relates to a method and a system for manufacturing a liquid crystal display device by feeding long carrier films from continuous rolls, respectively, wherein the continuous rolls include rolls of laminates including the long carrier films and pressure-sensitive adhesive-carrying optical films each with a specific width placed on the carrier films, respectively, and by bonding the optical films, which are being peeled off or have been peeled off from the carrier films, respectively, to first and second panel surfaces of a liquid crystal panel, respectively, with the pressure-sensitive adhesive interposed therebetween so that the liquid crystal display device is obtained.

2. Description of the Related Art

There is known a process including feeding long carrier films from continuous rolls, respectively, wherein the continuous rolls include rolls of laminates including the long carrier films and polarizing films placed on the carrier films, respectively, peeling off the polarizing films from the carrier films, respectively, and bonding the polarizing films to first and second panel surfaces of a liquid crystal panel, respectively, to obtain a liquid crystal display device (see Japanese Patent Application Laid-Open (JP-A) No. 2005-37417).

There is also known another process including bonding a first polarizing film to a first panel surface of a liquid crystal panel, further bonding an optical member (such as an optical compensation film) onto the first polarizing film, then rotating the liquid crystal panel, and then bonding a second polarizing film to a second panel surface (JP-A No. 2009-271516).

In the processes disclosed in Japanese Patent Application Laid-Open (JP-A) No. 2005-37417 and JP-A No. 2009-271516, the formation of a liquid crystal display device requires the crossed-Nicols relationship between the absorption axis (or transmission axis) of the first polarizing film bonded to the first panel surface and the absorption axis (or transmission axis) of the second polarizing film bonded to the second panel surface. If the first and second polarizing films each have an absorption axis in its longitudinal direction (or a transmission axis in its widthwise direction) and if the first and second polarizing films are drawn in parallel directions from their continuous rolls, the process may include bonding the first polarizing film to the first panel surface, then rotating the liquid crystal panel by 90°, and then bonding the second polarizing film to the second panel surface.

PRIOR ART DOCUMENT

Patent Document

Japanese Patent Application Laid-Open (JP-A) No. 2005-37417 and JP-A No. 2009-271516.

SUMMARY OF THE INVENTION

Unfortunately, there is fear that the rotation of the liquid crystal panel may cause dirt and dust to appear or be suspended, so that they may be deposited as contaminants between the second panel surface and the second polarizing film.

It is therefore considered that after the rotation operation, a predetermined period of time may be allowed to elapse, and then the second polarizing film may be bonded to the second panel surface. In this case, however, the productivity will be extremely reduced. It is also considered that a long feed line may be provided between the rotation apparatus and the bonding apparatus. In this case, however, the long feed line will increase the facility cost and the facility area.

The invention has been accomplished in view of the above circumstances, and an object of the invention is to provide a method and a system for manufacturing a liquid crystal display device, which can reduce contamination between the surface of a liquid crystal panel and a polarizing film by using a process in which rotating a liquid crystal panel is followed by bonding a second optical film to a first optical film bonded to the first panel surface so that any optical film can be prevented from being bonded to the panel surface immediately after the rotation of the liquid crystal panel.

The invention is directed to a method for manufacturing a liquid crystal display device by feeding long carrier films from continuous rolls, respectively, wherein the continuous rolls comprise rolls of laminates comprising the long carrier films and pressure-sensitive adhesive-carrying optical films each with a specific width placed on the carrier films, respectively, and by bonding the optical films, which are being peeled off or have been peeled off from the carrier films, respectively, to first and second panel surfaces of a liquid crystal panel, respectively, with the pressure-sensitive adhesive interposed therebetween so that the liquid crystal display device is obtained, the method includes:

a first bonding step including bonding a first optical film to the first panel surface of the liquid crystal panel, wherein the first optical film has a transmission axis in its widthwise direction;

a rotation step including rotating the liquid crystal panel with the first optical film bonded to the first panel surface;

a second bonding step including bonding a second optical film to the first optical film on the first panel surface, wherein the second optical film has a transmission axis in a direction perpendicular to its widthwise direction; and a third bonding step including bonding a third optical film to the second panel surface of the liquid crystal panel with the first and second optical films bonded to the first panel surface, wherein the third optical film has a transmission axis in its widthwise direction.

This feature can reduce contamination between the surface of the liquid crystal panel and a polarizing film. In some cases, contaminants may be deposited between the first and second optical films, because the second optical film is bonded onto the first optical film after the rotation. Even if contaminants are deposited, however, there will be no problem with appearance quality, because the crossed-Nicols relationship is maintained between the first and third optical films.

In an embodiment of the invention, in the first bonding step, the first optical film is bonded to the first panel surface on a side in contact with feeding means, while the liquid crystal panel is fed, in the second bonding step, the second optical film is bonded to the first optical film on the first panel surface on a side in contact with feeding means, while the liquid crystal panel is fed, and in the third bonding step, the third optical film is bonded to the second panel surface on a side not in contact with feeding means, while the liquid crystal panel is fed.

This feature can reduce the time for which the first panel surface of the liquid crystal panel is brought into contact with means for feeding the liquid crystal panel (such as a feed roller), so that static build-up on the first panel surface can be reduced, which can suppress a phenomenon in which dirt and dust suspended by the rotation of the liquid crystal panel are attracted to the first panel surface.

In an embodiment of the invention, the method further includes a turnover step including turning over the liquid crystal panel with the first and second optical films bonded to the first panel surface, which is performed between the second and third bonding steps, wherein in the first bonding step, the first optical film is bonded to the first panel surface on a side in contact with feeding means, while the liquid crystal panel is fed, in the second bonding step, the second optical film is bonded to the first optical film on the first panel surface on a side in contact with feeding means, while the liquid crystal panel is fed, and in the third bonding step, the third optical film is bonded to the second panel surface on a side in contact with feeding means, while the liquid crystal panel is fed.

According to this feature, the turnover step allows the second panel surface to face the feeding means, and then the third optical film is bonded to the second panel surface. Before the turnover step, the second panel surface is not in contact with the feeding means and therefore not electrostatically charged. Thus, even if dirt and dust are suspended by the turnover, a phenomenon in which dirt and dust are attracted to the floor side-facing second panel surface immediately after the turnover can be suppressed.

The other invention is directed to a system for manufacturing a liquid crystal display device by feeding long carrier films from continuous rolls, respectively, wherein the continuous rolls comprise rolls of laminates comprising the long carrier films and pressure-sensitive adhesive-carrying optical films each with a specific width placed on the carrier films, respectively, and by bonding the optical films, which are being peeled off or have been peeled off from the carrier films, respectively, to first and second panel surfaces of a liquid crystal panel, respectively, with the pressure-sensitive adhesive interposed therebetween, the system includes:

a plurality of bonding units including a first bonding unit for bonding a first optical film to the first panel surface of the liquid crystal panel, wherein the first optical film has a transmission axis in its widthwise direction, a second bonding unit for bonding a second optical film to the first optical film on the first panel surface, wherein the second optical film has a transmission axis in a direction perpendicular to its widthwise direction, and a third bonding unit for bonding a third optical film to the second panel surface of the liquid crystal panel with the first and second optical films bonded to the first panel surface, wherein the third optical film has a transmission axis in its widthwise direction; and a rotation unit for rotating the liquid crystal panel with the first optical film bonded to the first panel surface.

This feature can reduce contamination between the surface of the liquid crystal panel and a polarizing film. In some cases, contaminants may be deposited between the first and second optical films, because the second optical film is bonded onto the first optical film after the rotation. Even if contaminants are deposited, however, there will be no problem with appearance quality, because the crossed-Nicols relationship is maintained between the first and third optical films.

In an embodiment of the invention, the first bonding unit has a bonding roller for pressing the first optical film against the first panel surface and a backing roller placed opposite to the bonding roller, and the first bonding unit bonds the first optical film to the first panel surface on a side in contact with feeding means, while holding and feeding the first optical film and the liquid crystal panel between the bonding roller and the backing roller, the second bonding unit has a bonding roller for pressing the second optical film against the first panel surface and a backing roller placed opposite to the bonding roller, and the second bonding unit bonds the second optical film to the first optical film on the first panel surface on a side in contact with feeding means, while holding and feeding the second optical film and the liquid crystal panel between the bonding roller and the backing roller, and the third bonding unit has a bonding roller for pressing the third optical film against the second panel surface and a backing roller placed opposite to the bonding roller, and the third bonding unit bonds the third optical film to the second panel surface on a side not in contact with feeding means, while holding and feeding the third optical film and the liquid crystal panel between the bonding roller and the backing roller.

This feature can reduce the time for which the first panel surface of the liquid crystal panel is brought into contact with means for feeding the liquid crystal panel (such as a feed roller), so that static build-up on the first panel surface can be reduced, which can suppress a phenomenon in which dirt and dust suspended by the rotation of the liquid crystal panel are attracted to the first panel surface.

In an embodiment of the invention, the system further includes a turnover unit for turning over the liquid crystal panel with the first and second optical films bonded to the first panel surface, wherein the first bonding unit has a bonding roller for pressing the first optical film against the first panel surface and a backing roller placed opposite to the bonding roller, and the first bonding unit bonds the first optical film to the first panel surface on a side in contact with feeding means, while holding and feeding the first optical film and the liquid crystal panel between the bonding roller and the backing roller, the second bonding unit has a bonding roller for pressing the second optical film against the first panel surface and a backing roller placed opposite to the bonding roller, and the second bonding unit bonds the second optical film to the first optical film on the first panel surface on a side in contact with feeding means, while holding and feeding the second optical film and the liquid crystal panel between the bonding roller and the backing roller, and the third bonding unit has a bonding roller for pressing the third optical film against the second panel surface and a backing roller placed opposite to the bonding roller, and the third bonding unit bonds the third optical film to the second panel surface on a side in contact with feeding means, while holding and feeding the third optical film and the liquid crystal panel between the bonding roller and the backing roller.

According to this feature, the turnover unit allows the second panel surface to face the feeding means, and then the third optical film is bonded to the second panel surface. Before the turnover, the second panel surface is not in contact with the feeding means and therefore not electrostatically charged. Thus, even if dirt and dust are suspended by the turnover, a phenomenon in which dirt and dust are attracted to the floor side-facing second panel surface immediately after the turnover can be suppressed.

DETAILED DESCRIPTION OF THE PREFERRED EMBODIMENTS

Figure 1:
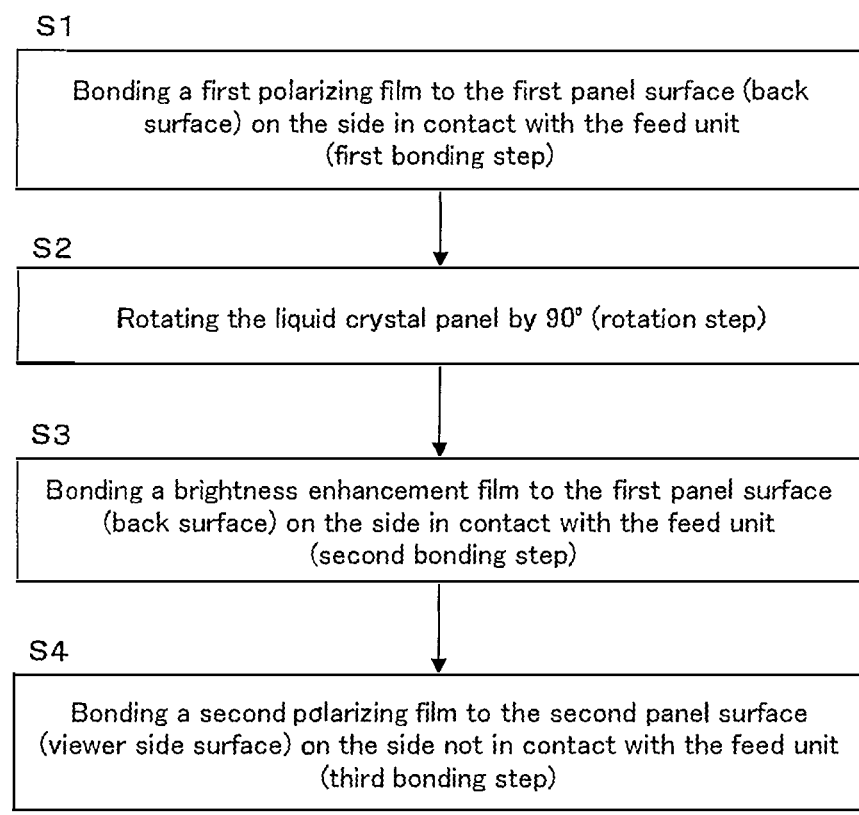
FIG. 1 is a flow chart of the method of Embodiment 1 for manufacturing a liquid crystal display device.

Each optical film may be of any type having a pressure-sensitive adhesive layer as an outermost layer, and it may be a monolayer structure or a multilayer structure. For example, each optical film may be a plastic film with a thickness of about 50 to about 200 μm.

For example, the optical film may be a polarizer or a polarizing film, and the polarizing film may have a structure including a polarizer and a polarizer protecting film or films placed on one or both sides of the polarizer. A surface protecting film or films may also be placed thereon to protect the polarizer or the polarizing film from scratches and others during transportation. Other examples of the optical film include optical compensation films such as retardation films and brightness enhancement films. The multilayer-structure optical film may include a polarizer or a polarizing film and a retardation film and/or a brightness enhancement film placed on the polarizer or polarizing film. Hereinafter, the term "MD polarizing film" may refer to an elongated polarizing film having an absorption axis in the longitudinal direction (or a transmission axis in the transverse direction (widthwise direction)), in which the polarizer has an absorption axis in the stretched direction, and the term "TD polarizing film" may refer to an elongated polarizing film having an absorption axis in the transverse direction (widthwise direction).

For example, the polarizing film may be a dichroic polarizing film. The dichroic polarizing film may be manufactured by a process including the steps of (A) dyeing, crosslinking, stretching, and drying a polyvinyl alcohol-based film to obtain a polarizer; (B) bonding a protecting layer or layers (a polarizer protecting film or films) to one or both sides of the polarizer; and (C) heat-treating the resulting laminate. Dyeing, crosslinking, and stretching of the polyvinyl alcohol-based film do not have to be each independently performed, and may be performed simultaneously, or they may be performed in any order. It will be understood that a polyvinyl alcohol-based film having undergone a swelling treatment may also be used as the polyvinyl alcohol-based film. In general, the polyvinyl alcohol-based film is immersed in a solution containing iodine or a dichroic dye so that the film is dyed with the adsorbed iodine or dichroic dye, then cleaned, uniaxially stretched to a stretch ratio of 3 to 7 in a solution containing boric acid, borax, or other additives, and then dried.

For example, the brightness enhancement film may be a reflective polarizing film having a multilayer structure with a reflection axis and a transmission axis. For example, the reflective polarizing film can be obtained by alternately stacking a plurality of polymer films A and B made of two different materials and stretching them. The refractive index of only the material A is changed and increased in the stretching direction, so that birefringence is produced, in which a reflection axis is formed in the stretching direction where there is a difference in refractive index at the material A-B interface, and a transmission axis is formed in the direction (non-stretching direction) where no difference in refractive index is produced. This reflective polarizing film has a transmission axis in the longitudinal direction and an absorption axis in the transverse direction (widthwise direction).

The outermost layer of the optical film includes a pressure-sensitive adhesive layer containing a pressure-sensitive adhesive, which is typically, but not limited to, an acrylic pressure-sensitive adhesive, a silicone-based pressure-sensitive adhesive, a urethane-based pressure-sensitive adhesive, or the like. For example, a plastic film (such as a polyethylene terephthalate-based film or a polyolefin-based film) or any other film may be used to form the carrier film. Any appropriate film such as a film coated with an appropriate release agent such as a silicone, long-chain alkyl, or fluoride release agent, or molybdenum sulfide may also be used as needed.

In an embodiment of the invention, the optical film may be formed on the carrier film in any mode. For example, they may be wound to form a continuous roll. For example, the continuous roll may be (1) a roll of an optical film laminate including a carrier film and a pressure-sensitive adhesive-carrying optical film formed on the carrier film. In this case, the system for manufacturing a liquid crystal display device has cutting means for cutting the optical film into sheet pieces of the optical film in such a manner that the optical film (carrying the pressure-sensitive adhesive) is cut at predetermined intervals, while the carrier film is left uncut (cutting means for performing half-cutting). For example, the cutting may be performed in such a manner as to classify non-defective and defective sheet pieces based on the result of an inspection performed using a defect inspection apparatus in the continuous manufacturing system.

Alternatively, for example, the continuous roll may be (2) a roll of an optical film laminate including a carrier film and sheet pieces of pressure-sensitive adhesive-carrying optical film formed on the carrier film (a continuous roll of a so-called scored optical film).

The liquid crystal display device includes a liquid crystal panel and at least a sheet piece or pieces of polarizing film provided on one or both sides of the liquid crystal panel, into which a driving circuit is incorporated as needed. The liquid crystal panel to be used may be of any type such as a vertical alignment (VA) type or an in-plane switching (IPS) type. The liquid crystal panel P shown in FIG. 2 or 3 has a structure including a pair of substrates (a backside substrate Pa and a viewer side substrate Pb) opposed to each other and a liquid crystal layer sealed in between the substrates.

Embodiment 1

Method for Manufacturing Liquid Crystal Display Device

The method for manufacturing a liquid crystal display device includes: feeding long carrier films from continuous rolls, respectively, wherein the continuous rolls include rolls of laminates including the long carrier films and pressure-sensitive adhesive-carrying optical films each with a specific width placed on the carrier films, respectively; and bonding the optical films, which are being peeled off or have been peeled off from the carrier films, respectively, to first and second panel surfaces of a liquid crystal panel, respectively, with each pressure-sensitive adhesive interposed therebetween so that the liquid crystal display device is obtained. In the liquid crystal display device-manufacturing method, the process until the bonding step includes carrier film feeding steps including feeding the carrier films from the continuous rolls, respectively; and peeling steps including peeling off the optical films (such as polarizing films or brightness enhancement films) from the carrier films, respectively. FIG. 1 is a diagram showing a flow chart of the manufacturing method of Embodiment 1.

(First Bonding Step)

In a first carrier film feeding step, a first polarizing film laminate (a laminated film including a carrier film and a polarizing film placed thereon) is drawn from a continuous roll and fed to the downstream side. During the feeding, the first polarizing film is cut at specific intervals in the widthwise direction perpendicular to the longitudinal direction, while the carrier film is left uncut, so that a sheet piece of the first polarizing film is formed on the carrier film. When the continuous roll is a roll of a scored polarizing film as mentioned above, this cutting step is unnecessary. In the peeling step, the carrier film is inwardly folded back at a front end part of a peeling unit so that a sheet piece of the first polarizing film is peeled off from the carrier film and supplied to the bonding position in a first bonding unit. At this time, the liquid crystal panel with its first panel surface being in contact with a feed unit (with its first panel surface facing the floor surface) is fed to the bonding position in the first bonding unit by the feed unit (the feeding step). In the first bonding step, the first bonding unit, which has a bonding roller for pressing the first optical film against the first panel surface and a backing roller placed opposite to the bonding roller, bonds the sheet piece of the first polarizing film, which has a transmission axis in the widthwise direction, to the first panel surface (back surface) of the liquid crystal panel facing the floor surface, while it holds and feeds the first optical film and the liquid crystal panel between the boding roller and the backing roller (step S1).

(Rotation Step)

Subsequently, the rotation unit rotates by 90° the liquid crystal panel with the sheet piece of the first polarizing film bonded thereto (the rotation step (step S2)).

(Second Bonding Step)

In a second carrier film feeding step, a reflective polarizing film laminate (a laminated film including a carrier film and a reflective polarizing film placed thereon) is drawn from a continuous roll and fed to the downstream side. During the feeding, the reflective polarizing film is cut at specific intervals in the widthwise direction perpendicular to the longitudinal direction, while the carrier film is left uncut, so that a sheet piece of the reflective polarizing film is formed on the carrier film. When the continuous roll is a roll of a scored reflective polarizing film as mentioned above, this cutting step is unnecessary. In the peeling step, the carrier film is inwardly folded back at a front end part of a peeling unit so that a sheet piece of the reflective polarizing film is peeled off from the carrier film and supplied to the bonding position in a second bonding unit. At this time, the liquid crystal panel with its first panel surface (with the first polarizing film bonded thereto) being in contact with a feed unit (with its first panel surface facing the floor surface) is fed to the bonding position in the second bonding unit by the feed unit (the feeding step). In the second bonding step, the second bonding unit, which has a bonding roller for pressing the second optical film against the first panel surface and a backing roller placed opposite to the bonding roller, bonds the sheet piece of the reflective polarizing film, which has an absorption axis in the widthwise direction, to the sheet piece of the first polarizing film on the first panel surface (back surface) of the liquid crystal panel facing the floor surface, while it holds and feeds the second optical film and the liquid crystal panel between the boding roller and the backing roller (step S3).

(Third Bonding Step)

In a third carrier film feeding step, a second polarizing film laminate (a laminated film including a carrier film and a second polarizing film placed thereon) is drawn from a continuous roll and fed to the downstream side. During the feeding, the second polarizing film is cut at specific intervals in the widthwise direction perpendicular to the longitudinal direction, while the carrier film is left uncut, so that a sheet piece of the second polarizing film is formed on the carrier film. When the continuous roll is a roll of a scored second polarizing film as mentioned above, this cutting step is unnecessary. In the peeling step, the carrier film is inwardly folded back at a front end part of a peeling unit so that a sheet piece of the second polarizing film is peeled off from the carrier film and supplied to the bonding position in a third bonding unit. At this time, the liquid crystal panel with its second panel surface being not in contact with a feed unit (with its second panel surface facing the ceiling) is fed to the bonding position in the third bonding unit by the feed unit (the feeding step). In the third bonding step, the third bonding unit, which has a bonding roller for pressing the third optical film against the second panel surface and a backing roller placed opposite to the bonding roller, bonds the sheet piece of the second polarizing film, which has a transmission axis in the widthwise direction, to the second panel surface (viewer side surface) of the liquid crystal panel facing the ceiling, while it holds and feeds the third optical film and the liquid crystal panel between the boding roller and the backing roller (step S4). As a result, the crossed-Nicols relationship is established between the transmission axis (or absorption axis) of the first polarizing film on the first panel surface and the transmission axis (or absorption axis) of the second polarizing film on the second panel surface.

(System for Manufacturing Liquid Crystal Display Device)

The liquid crystal display device manufacturing system is configured to feed long carrier films from continuous rolls, respectively, which are rolls of laminates including the long carrier films and pressure-sensitive adhesive-carrying optical films each with a specific width placed on the carrier films, respectively, and has a plurality of bonding units for bonding the optical films, which are being peeled off or have been peeled off from the carrier films, respectively, to first and second panel surfaces of a liquid crystal panel, respectively, with the pressure-sensitive adhesive interposed therebetween.

Hereinafter, the liquid crystal display device manufacturing system of Embodiment 1 is described with reference to FIG. 2. This manufacturing system includes a plurality of sheet piece lamination apparatuses each having a carrier film feed unit, a peeling unit, and a bonding unit. A first sheet piece lamination apparatus 100 is provided to laminate a sheet piece of a first polarizing film to a first panel surface (back surface) of a liquid crystal panel along (parallel to) the direction of the short side of the liquid crystal panel. A second sheet piece lamination apparatus 200 is provided to laminate a sheet piece of a reflective polarizing film to the first polarizing film on the first panel surface of the liquid crystal panel along (parallel to) the direction of the long side of the liquid crystal panel. A third sheet piece lamination apparatus 300 is provided to laminate a sheet piece of a second polarizing film to a second panel surface (viewer side surface) of the liquid crystal panel along (parallel to) the direction of the long side of the liquid crystal panel.

Figure 2:
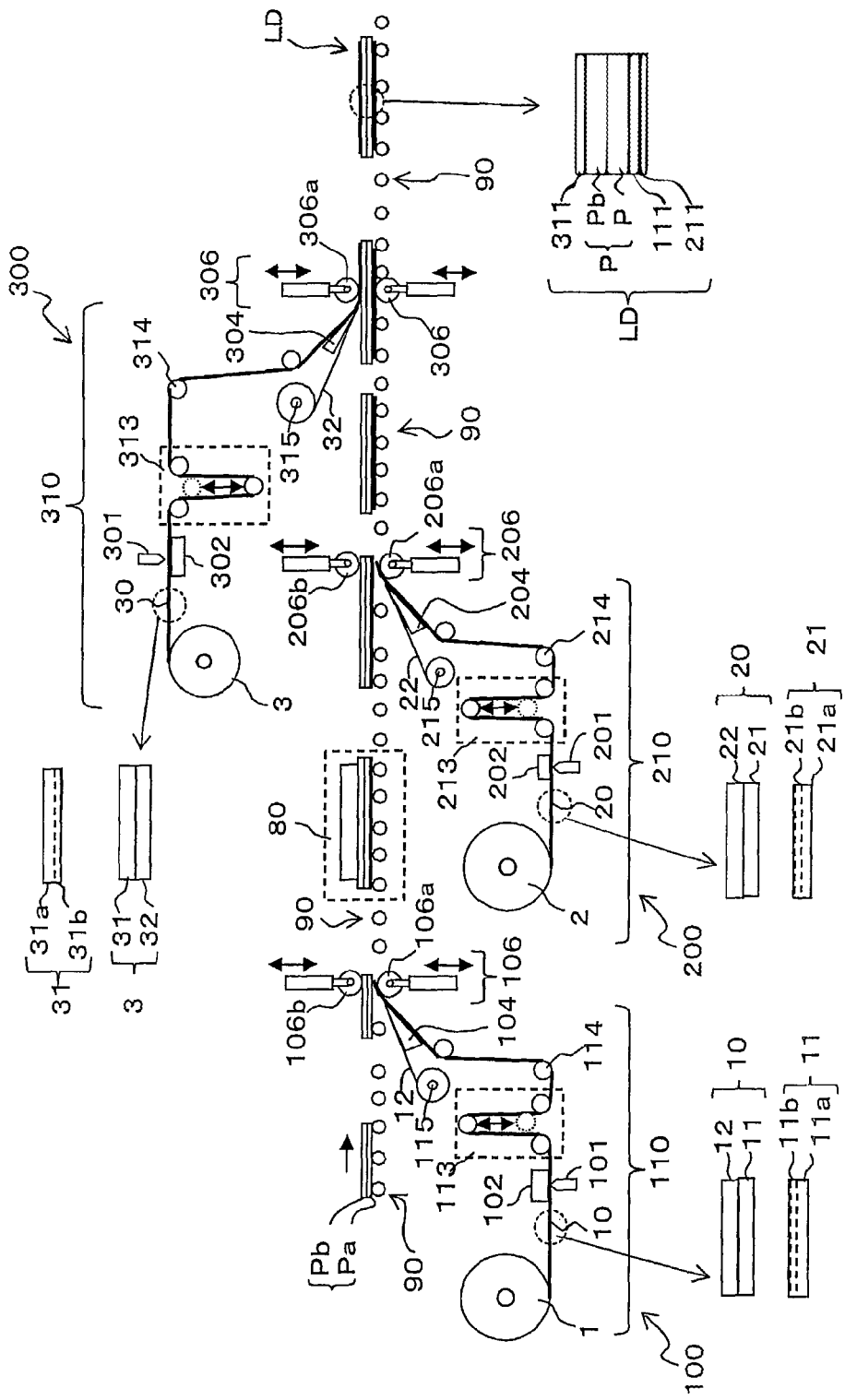
FIG. 2 is a diagram for illustrating the system of Embodiment 1 for manufacturing a liquid crystal display device.
Figure 3:
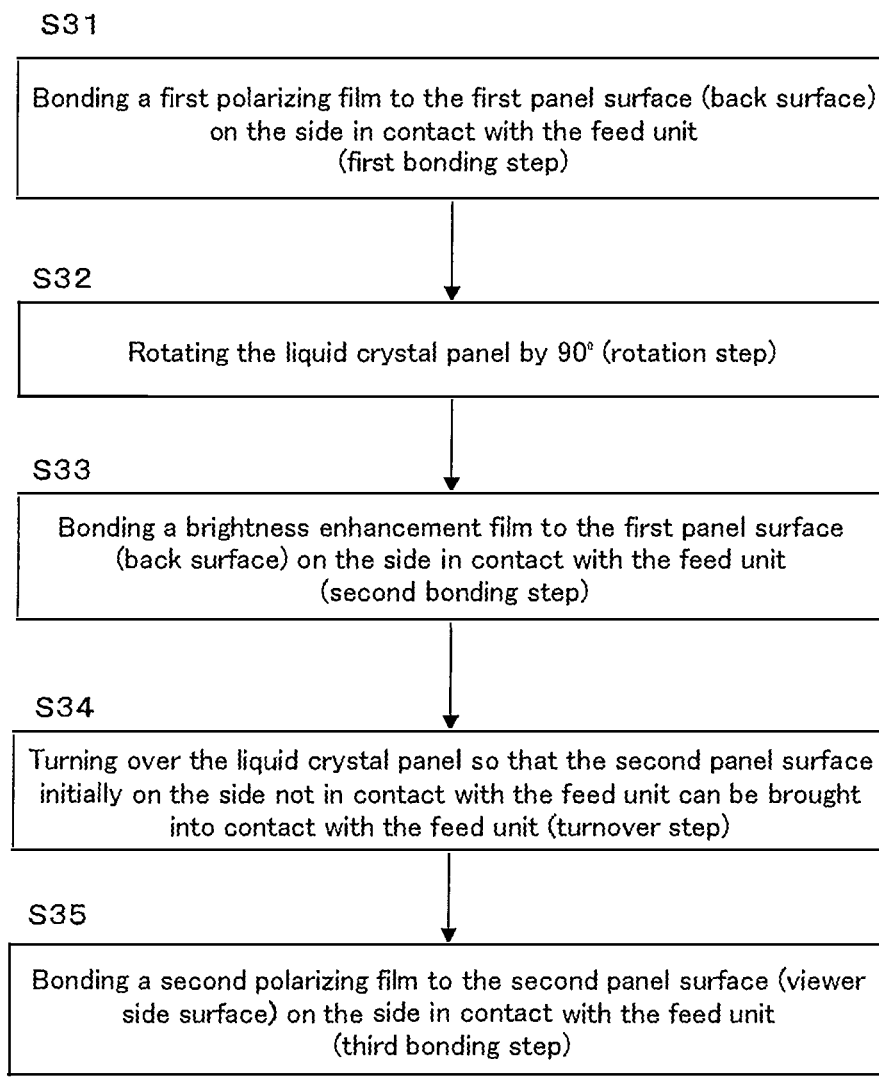
FIG. 3 is a flow chart of the method of Embodiment 2 for manufacturing a liquid crystal display device.

As shown in FIG. 2, the first sheet piece lamination apparatus 100 has a carrier film feed unit 110, a liquid crystal panel feed unit 90, a peeling unit 104, and a first bonding unit 106.

The second sheet piece lamination apparatus 200 has a carrier film feed unit 210, a liquid crystal panel feed unit 90, a peeling unit 204, and a second bonding unit 206. The third sheet piece lamination apparatus 300 has a liquid crystal panel feed unit 90, a carrier film feed unit 310, a peeling unit 304, and a third bonding unit 306. In this embodiment, the liquid crystal panel feed unit 90 feeds a liquid crystal panel P in a direction parallel to the direction of the short side of the liquid crystal panel P. A sheet piece 111 of a first polarizing film 11 is bonded to a first panel surface Pa (on the floor surface side in FIG. 2) of the liquid crystal panel P along the direction of the short side of the liquid crystal panel P. Subsequently, a rotation unit rotates by 90° the liquid crystal panel P with the sheet piece 111 bonded thereto. Subsequently, a sheet piece 211 of a reflective polarizing film 21 is bonded to the first panel surface Pa (on the floor surface side in FIG. 2) of the liquid crystal panel P along the direction of the long side of the liquid crystal panel P. Subsequently, a sheet piece 311 of a second polarizing film 31 is bonded to a second panel surface Pb (viewer side surface, on the ceiling side in FIG. 2) of the liquid crystal panel P along the direction of the long side of the liquid crystal panel P.

(Sheet Piece Lamination Apparatuses)

First, a description is given of the first sheet lamination apparatus 100. The liquid crystal panel feed unit 90 feeds the liquid crystal panel P to the first bonding unit 106. In this embodiment, the liquid crystal panel feed unit 90 includes a feed roller, a suction plate, and other components. The liquid crystal panel P is fed to the downstream side of the manufacturing line by rotating the feed roller or shifting the suction plate.

The carrier film feed unit 110 draws a long first polarizing film laminate 10 from a continuous roll 1, wherein the laminate 10 includes a long carrier film 12 and a pressure-sensitive adhesive-carrying long first polarizing film 11 (including a film part 11a and a pressure-sensitive adhesive layer 11b) placed thereon, and cuts the first polarizing film 11 at predetermined intervals while leaving the carrier film 12 uncut, so that a sheet piece 111 of the first polarizing film 11 is formed on the carrier film 12. The first polarizing film 11 has a transmission axis in the widthwise direction. The carrier film feed unit 110 has a cutting part 101, a feed roller 114, dancer rolls 113, and a take-up part 115. It should be noted that FIG. 2 is a schematic diagram and not intended to limit the number of feed rollers 114 or the position where feed rollers 114 are placed.

The cutting part 101 holds the carrier film 12 by using a suction part 102 and cuts the first polarizing film 11 at predetermined intervals, while leaving the carrier film 12 uncut, so that a sheet piece 111 of the first polarizing film 11 is formed on the carrier film 12. For example, the cutting part 101 may be a cutter, a laser, or the like.

The dancer rolls 113 each have the function of maintaining tension on the carrier film 12. The carrier film feed unit 110 feeds the carrier film 12 via the dancer rolls 113.

The take-up part 115 takes up the carrier film 12 from which the sheet piece 111 is peeled off. The system may further include a feeding roller, a feed roller, or any other part (not shown) between the first bonding unit 106 and the take-up part 115.

The peeling unit 104 inwardly folds back the carrier film 12 at its front end part to peel off the sheet piece 111 (carrying the pressure-sensitive adhesive) of the first polarizing film 11 from the carrier film 12 and feeds the sheet piece 111 to the bonding position in the first bonding unit 106. In this embodiment, a sharp knife edge part is used as a non-limiting example of the front end part of the peeling unit 104.

The first bonding unit 106 bonds the sheet piece 111 of the first polarizing film 11, which is peeled off in the peeling unit 104, to the first panel surface Pa of the liquid crystal panel P, which is fed by the liquid crystal panel feed unit 90, with the pressure-sensitive adhesive 11b interposed therebetween. In this embodiment, the first bonding unit 106 includes: a bonding roller 106a for pressing the sheet piece 111 of the first polarizing film 11 against the first panel surface Pa; and a driving roller 106b (corresponding to the backing roller) placed opposite to the bonding roller 106a. The first bonding unit 106 performs the bonding by holding the sheet piece 111 of the first polarizing film 11 and the liquid crystal panel P between the bonding roller 106a and the driving roller 106b and by rotating the bonding roller 106a and the driving roller 106b along the feed direction.

(Rotation Unit)

Figure 5:
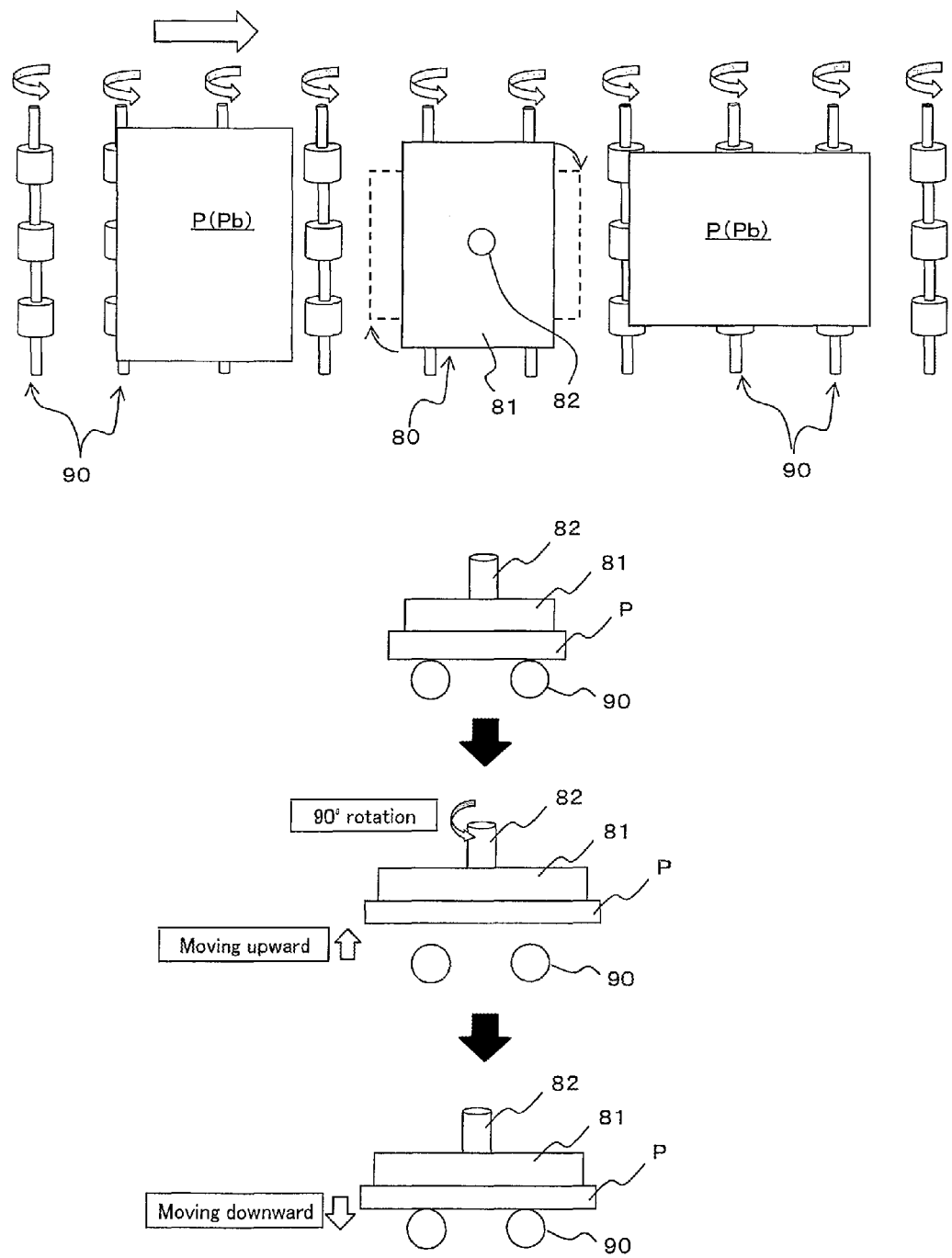
FIG. 5 is a diagram for illustrating a rotation unit (rotation step)

The liquid crystal panel P with the sheet piece 111 of the first polarizing film 11 bonded thereto is fed to the rotation position in the rotation unit 80 by the liquid crystal panel feed unit 90. FIG. 5 shows the rotation unit 80 and the motion of it. The rotation unit 80 has a suction plate 81 for sucking the second panel surface Pb of the liquid crystal panel P and a vertical-shift/rotation driving part 82 for lifting the suction plate 81, which sucks the liquid crystal panel P, horizontally rotating it by 90°, and placing it back on the liquid crystal panel feed unit 90.

The second sheet piece lamination apparatus 200 includes the same components as the first sheet piece lamination apparatus 100. The carrier film feed unit 210 draws a long reflective polarizing film laminate 20 from a continuous roll 2, wherein the laminate 20 includes a long carrier film 22 and a pressure-sensitive adhesive-carrying long reflective polarizing film 21 (including a film part 21a and a pressure-sensitive adhesive layer 21b) placed thereon, and cuts the reflective polarizing film 21 at predetermined intervals while leaving the carrier film 22 uncut, so that a sheet piece 211 of the reflective polarizing film 21 is formed on the carrier film 22. The reflective polarizing film 21 has an absorption axis in the widthwise direction. The carrier film feed unit 210 has a cutting part 201, a feed roller 214, dancer rolls 213, and a take-up part 215. It should be noted that FIG. 2 is a schematic diagram and not intended to limit the number of feed rollers 214 or the position where feed rollers 214 are placed.

The cutting part 201 holds the carrier film 22 by using a suction part 202 and cuts the reflective polarizing film 21 at predetermined intervals, while leaving the carrier film 22 uncut, so that a sheet piece 211 of the reflective polarizing film 21 is formed on the carrier film 22. For example, the cutting part 201 may be a cutter, a laser, or the like.

The dancer rolls 213 each have the function of maintaining tension on the carrier film 22. The carrier film feed unit 210 feeds the carrier film 22 via the dancer rolls 213.

The take-up part 215 takes up the carrier film 22 from which the sheet piece 211 is peeled off. The system may further include a feeding roller, a feed roller, or any other part (not shown) between the second bonding unit 206 and the take-up part 215.

The peeling unit 204 inwardly folds back the carrier film 22 at its front end part to peel off the sheet piece 211 (carrying the pressure-sensitive adhesive) of the reflective polarizing film 21 from the carrier film 22 and feeds the sheet piece 211 to the bonding position in the second bonding unit 206. In this embodiment, a sharp knife edge part is used as a non-limiting example of the front end part of the peeling unit 204.

The second bonding unit 206 bonds the sheet piece 211 of the reflective polarizing film 21, which is peeled off in the peeling unit 204, to the sheet piece 111 of the first polarizing film 11 on the first panel surface Pa of the liquid crystal panel P, which is fed by the liquid crystal panel feed unit 90, with the pressure-sensitive adhesive 21b interposed therebetween. In this embodiment, the second bonding unit 206 includes: a bonding roller 206a for pressing the sheet piece 211 of the reflective polarizing film 21 against the first panel surface Pa; and a driving roller 206b (corresponding to the backing roller) placed opposite to the bonding roller 206a. The second bonding unit 206 performs the bonding by holding the sheet piece 211 of the reflective polarizing film 21 and the liquid crystal panel P between the bonding roller 206a and the driving roller 206b and by rotating the bonding roller 206a and the driving roller 206b along the feed direction. The liquid crystal panel P with the sheet piece 211 of the reflective polarizing film 21 bonded thereto is fed to the bonding position in the third bonding unit 306 by the liquid crystal panel feed unit 90.

The third sheet piece lamination apparatus 300 includes the same components as the first sheet piece lamination apparatus 100. The carrier film feed unit 310 draws a long second polarizing film laminate 30 from a continuous roll 3, wherein the laminate 30 includes a long carrier film 32 and a pressure-sensitive adhesive-carrying long second polarizing film 31 (including a film part 31a and a pressure-sensitive adhesive layer 31b) placed thereon, and cuts the second polarizing film 31 at predetermined intervals while leaving the carrier film 32 uncut, so that a sheet piece 311 of the second polarizing film 31 is formed on the carrier film 32. The second polarizing film 31 has a transmission axis in the widthwise direction. The carrier film feed unit 310 has a cutting part 301, a feed roller 314, dancer rolls 313, and a take-up part 315. It should be noted that FIG. 2 is a schematic diagram and not intended to limit the number of feed rollers 314 or the position where feed rollers 314 are placed.

The cutting part 301 holds the carrier film 32 by using a suction part 302 and cuts the second polarizing film 31 at predetermined intervals, while leaving the carrier film 32 uncut, so that a sheet piece 311 of the second polarizing film 31 is formed on the carrier film 32. For example, the cutting part 301 may be a cutter, a laser, or the like.

The dancer rolls 313 each have the function of maintaining tension on the carrier film 32. The carrier film feed unit 310 feeds the carrier film 32 via the dancer rolls 313.

The take-up part 315 takes up the carrier film 32 from which the sheet piece 311 is peeled off. The system may further include a feeding roller, a feed roller, or any other part (not shown) between the third bonding unit 306 and the take-up part 315.

The peeling unit 304 inwardly folds back the carrier film 32 at its front end part to peel off the sheet piece 311 (carrying the pressure-sensitive adhesive) of the second polarizing film 31 from the carrier film 32 and feeds the sheet piece 311 to the bonding position in the third bonding unit 306. In this embodiment, a sharp knife edge part is used as a non-limiting example of the front end part of the peeling unit 304.

The third bonding unit 306 bonds the sheet piece 311 of the second polarizing film 31, which is peeled off in the peeling unit 304, to the second panel surface Pb of the liquid crystal panel P, which is fed by the liquid crystal panel feed unit 90, with the pressure-sensitive adhesive 31b interposed therebetween. In this embodiment, the third bonding unit 306 includes: a bonding roller 306a for pressing the sheet piece 311 of the second polarizing film 31 against the second panel surface Pb; and a driving roller 306b (corresponding to the backing roller) placed opposite to the bonding roller 306a. The third bonding unit 306 performs the bonding by holding the sheet piece 311 of the second polarizing film 31 and the liquid crystal panel P between the bonding roller 306a and the driving roller 306b and by rotating the bonding roller 306a and the driving roller 306b along the feed direction.

As shown in FIG. 2, the liquid crystal display device LD has: the liquid crystal panel P; the sheet piece 111 of the first polarizing film bonded to the first panel surface Pa of the liquid crystal panel P; the sheet piece 211 of the reflective polarizing film bonded to the sheet piece 111 of the first polarizing film; and the sheet piece 311 of the second polarizing film bonded to the second panel surface Pb of the liquid crystal panel P. The liquid crystal display device LD may be fed to an inspection apparatus or stocker (not shown).

(Control Unit)

A control unit (not shown) is provided to control each of the sheet piece lamination apparatuses 100, 200, and 300. The control units also controls the liquid crystal panel feed unit and the rotation unit 80. For example, the timing of the operation of each unit and each apparatus is calculated by a detecting method using sensors placed at specific locations or by a method of detecting the rotating part of the feed unit or the feeding mechanism with a rotary encoder or the like. The control unit may be implemented in cooperation with software programs and hardware resources such as CPU and memories. In this case, program software, procedures, various settings, etc. are previously stored in memories. Alternatively, the control unit may include private circuits, firmware, and others.

Embodiment 2

Method for Manufacturing Liquid Crystal Display Device

The liquid crystal display device manufacturing method of Embodiment 2 has a turnover step between the second bonding step and the third bonding step. The first, second, and third bonding steps each include bonding a sheet piece of an optical film to the floor side-facing panel surface on the side in contact with the feed unit. FIG. 2 shows a flow chart of the manufacturing method of Embodiment 2. The same steps as in Embodiment 1 will be described briefly or omitted from the description. The first bonding step (step S31), the rotation step (step S32), and the second bonding step (step S33) are the same as in Embodiment 1.

(Turnover Step)

The liquid crystal panel P with the sheet pieces 111 and 211 of the first polarizing film and the reflective polarizing film bonded thereto is turned over so that the second panel surface Pb, which initially faces the ceiling, is turned over, by a turnover part, to face the floor surface and come into contact with the feed unit (the turnover step (step S34)).

Subsequently, the third bonding step is performed, in which the third bonding unit has a bonding roller 306a for pressing the sheet piece 311 of the second polarizing film 31 against the second panel surface Pb and a driving roller 306b (corresponding to the backing roller) placed opposite to the bonding roller 306a. The third bonding unit bonds the sheet piece 311 of the second polarizing film 31 to the second panel surface Pb by holding the sheet piece 311 and the liquid crystal panel P between the bonding roller 306a and the driving roller 306b and by rotating the bonding roller 306a and the driving roller 306b along the feed direction. In this step, the sheet piece 311 of the second polarizing film 31, which has a transmission axis in the widthwise direction, is bonded to the second panel surface (viewer side surface) Pb of the liquid crystal panel P facing the floor surface (step S35). As a result, the crossed-Nicols relationship is established between the transmission axis (or absorption axis) of the first polarizing film on the first panel surface and the transmission axis (or absorption axis) of the second polarizing film on the second panel surface.

(System for Manufacturing Liquid Crystal Display Device)

Figure 4:
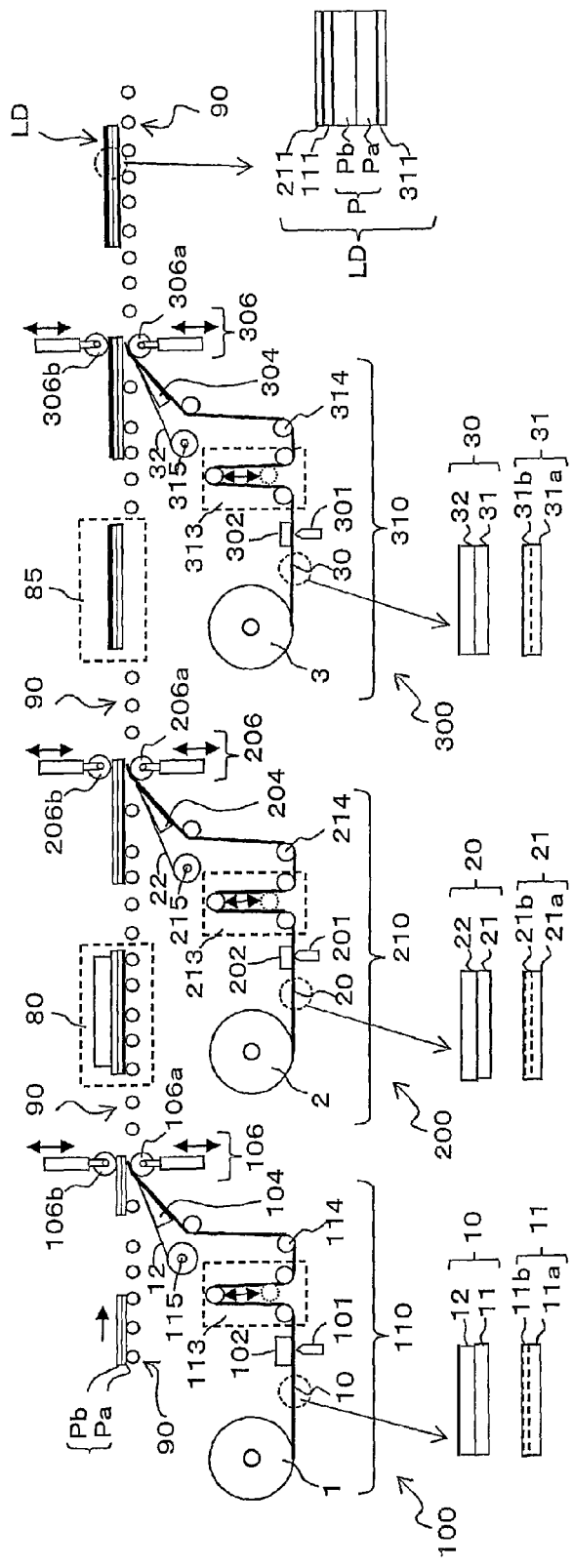
FIG. 4 is a diagram for illustrating the system of Embodiment 2 for manufacturing a liquid crystal display device.

FIG. 4 shows a schematic diagram of the manufacturing system of Embodiment 2. The same apparatuses and mechanisms as in Embodiment 1 will be described briefly or omitted from the description. The manufacturing system of Embodiment 2 has a first sheet piece lamination apparatus 100, a second sheet piece lamination apparatus 200, a turnover unit 80, and a liquid crystal panel feed unit 90, each of which has the same function and structure as each corresponding component in Embodiment 1. A third sheet piece lamination apparatus 300 is also provided, which has the same function and structure as the first sheet piece lamination apparatus 100 or the second sheet piece lamination apparatus 200.

(Turnover Unit)

Figure 6:
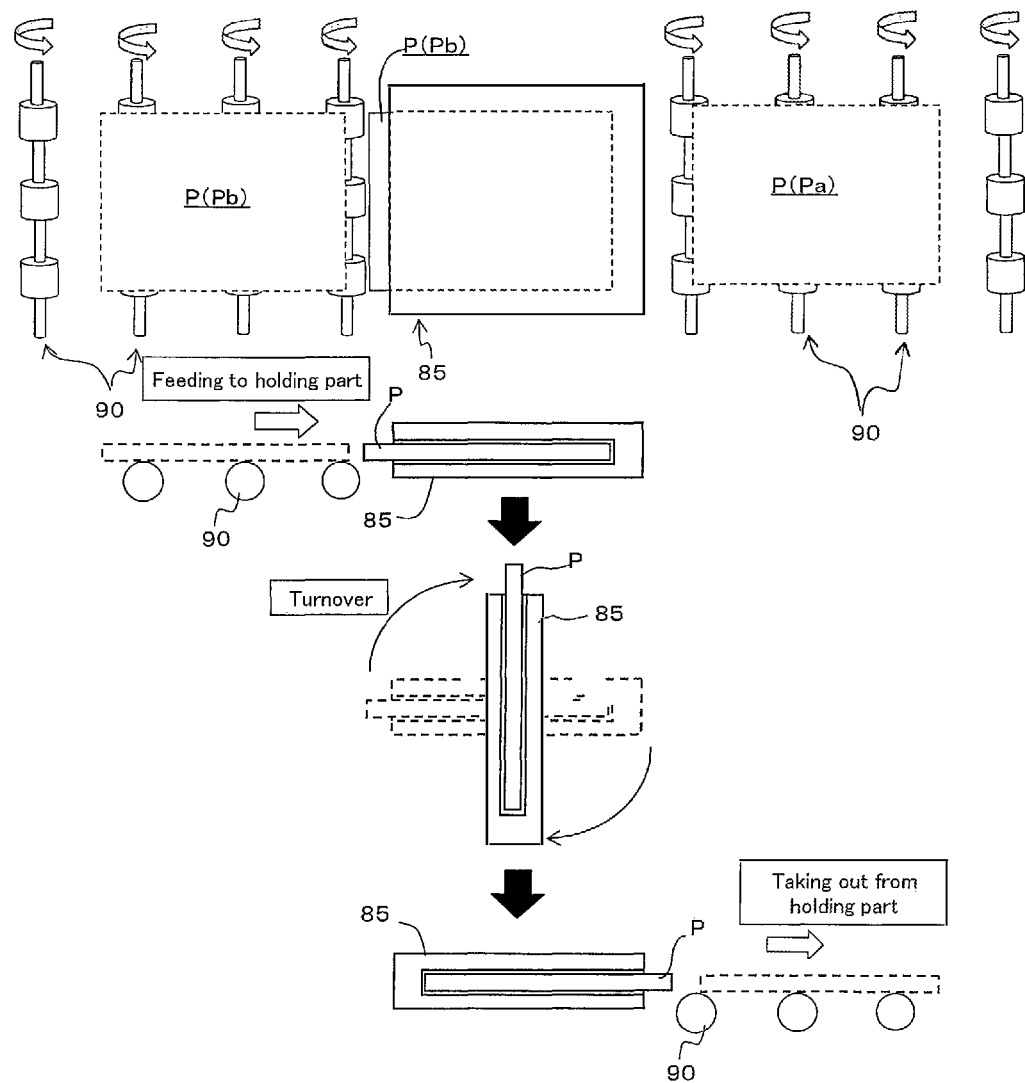
FIG. 6 is a diagram for illustrating a turnover unit (turnover step).

FIG. 6 shows a turnover unit 85 and the motion of it. The liquid crystal panel P with the sheet piece 111 of the first polarizing film 11 and the sheet piece 211 of the reflective polarizing film bonded thereto is fed to the turnover position in the turnover unit 85 by the liquid crystal panel feed unit 90. The liquid crystal panel P is inserted into the holding part of the turnover unit 85. The turnover unit 85 holding the liquid crystal panel P rotates clockwise 180° as viewed in FIG. 6 by using a rotation mechanism (not shown). Subsequently, the liquid crystal panel P is fed to the liquid crystal panel feed unit 90 and then fed to the third bonding unit 306 by the liquid crystal panel feed unit 90. For example, the mechanism for feeding the liquid crystal panel P from the holding part to the liquid crystal panel feed unit 90 may be a mechanism for pushing out it by using an air pressure, a mechanism for drawing it by suction, or the like. The turnover unit is not limited to a turnover mechanism having a holding part, and, for example, it may include a suction/turnover mechanism for sucking and turning over the second panel surface Pb.

Other Embodiments

In Embodiments 1 and 2, the first and second polarizing films are MD polarizing films. This is non-limiting, and alternatively, they may be TD polarizing films. In Embodiment 1, the first polarizing film is bonded in the direction of the short side of the liquid crystal panel, and the second polarizing film is bonded in the direction of the long side. Alternatively, the first polarizing film may be bonded in the direction of the long side of the liquid crystal panel, and the second polarizing film may be bonded in the direction of the short side.

The process may further include an inspection step including inspecting the optical film (such as the polarizing film or the reflective polarizing film) for defects (for example, by transmission inspection) before the cutting step for forming the sheet piece on the carrier film, in which cutting may be performed in such a manner that defects are avoided (called skip cutting) based on the result of the inspection step. Alternatively, the skip cutting may be performed while defect information previously attached to the optical film or the carrier film is read out.

In Embodiment 1 described above, the optical film is bonded to the floor-side first panel surface in each of the first and second bonding steps, and the optical film is bonded to the ceiling-side second panel surface in the third bonding step. This is non-limiting, and alternatively, the optical film may be bonded to the ceiling-side first (or second) panel surface in each of the first and second bonding steps, and the optical film may be bonded to the floor-side second (or first) panel surface in the third bonding step.

In Embodiment 2 described above, the optical film is bonded to the floor-side panel surface in each of the first, second, and third bonding steps. This is non-limiting, and alternatively, the optical film may be bonded to the ceiling-side panel surface in each of the first, second, and third bonding steps.

In Embodiments described above, the mechanism of the rotation unit is not limited to that described above, and alternatively, for example, it may include a mechanism for lifting the liquid crystal panel from below and rotating the liquid crystal panel.

EXAMPLES

None of the processes of Example 1 and Comparative Example 1 contain a turnover step. The process of Example 1 included: bonding a first polarizing film to the first panel surface of a liquid crystal panel (40 inches in size) using the manufacturing system of Embodiment 1 (FIG. 2) described above, wherein the first panel surface was in contact with the feed unit and faced the floor surface; rotating the panel by 90°; then bonding a reflective polarizing film onto the first polarizing film; and bonding a second polarizing film to the second panel surface, which faced the ceiling and was not in contact with the feed unit. The process of Comparative Example 1 included: bonding a first polarizing film to the first panel surface being in contact with the feed unit and facing the floor surface; then rotating the panel by 90°; bonding a second polarizing film to the second panel surface facing the ceiling and being not in contact with the feed unit; and then bonding a reflective polarizing film to the first polarizing film that was in contact with the feed unit and placed on the first panel surface, and faced the floor surface.

The processes of Example 2 and Comparative Example 2 each contain a turnover step. The process of Example 2 included: bonding a first polarizing film to the first panel surface of a liquid crystal panel (40 inches in size) using the manufacturing system of Embodiment 2 (FIG. 4) described above, wherein the first panel surface was in contact with the feed unit and faced the floor surface; rotating the liquid crystal panel by 90°; then bonding a reflective polarizing film onto the first polarizing film; further turning over the liquid crystal panel; and bonding a second polarizing film to the second panel surface being in contact with the feed unit and facing the floor surface. The process of Comparative Example 2 included: bonding a first polarizing film to the first panel surface being in contact with the feed unit and facing the floor surface; then rotating the liquid crystal panel by 90°; then turning over the liquid crystal panel; bonding a second polarizing film to the second panel surface being in contact with the feed unit and facing the floor surface; then turning over the liquid crystal panel; and bonding a reflective polarizing film to the first polarizing film on the first panel surface, wherein the first polarizing film was in contact with the feed unit and faced the floor surface.

SEG1423DU manufactured by NITTO DENKO CORPORATION was used as each of the first and second polarizing films, and DBEF manufactured by 3M Company was used as the reflective polarizing film. In each of the examples and the comparative examples, it was evaluated how many pieces were determined to have a defective appearance by a visual inspection due to contaminants suspended by the rotation of the liquid crystal panel. Table 1 shows the results of the evaluation of Example 1 and Comparative Example 1, and Table 2 shows the results of the evaluation of Example 2 and Comparative Example 2.

TABLE 1

| | Bonding sequence | | | | | | | | Number of pieces with defective appearance (out of 100 pieces) |
|---|---|---|---|---|---|---|---|---|---|
| | First bonding step | Feeding | Rotation step | Turnover | Second bonding step | Feeding | Turnover step | Third bonding step | |
| Example 1 | Bonding a first polarizing film to the first panel surface on the side in contact with the feed unit | → | 90° rotation | Absent | Bonding a reflective polarizing film to the first polarizing film on the side in contact with the feed unit | → | Absent | Bonding a second polarizing film to the second panel surface on the side not in contact with the feed unit | 1 |
| Comparative Example 1 | Bonding a first polarizing film to the first panel surface on the side in contact with the feed unit | → | 90° rotation | Absent | Bonding a second polarizing film to the second panel surface on the side not in contact with the feed unit | → | Absent | Bonding a reflective polarizing film to the first polarizing film on the side in contact with the feed unit | 4 |

TABLE 2

| | Bonding sequence | | | | | | | | Number of pieces with defective appearance (out of 100 pieces) |
|---|---|---|---|---|---|---|---|---|---|
| | First bonding step | Feeding | Rotation step | Turnover | Second bonding step | Feeding | Turnover step | Third bonding step | |
| Example 2 | Bonding a first polarizing film to the first panel surface on the side in contact with the feed unit | → | 90° rotation | Absent | Bonding a reflective polarizing film to the first polarizing film on the side in contact with the feed unit | → | Turnover | Bonding a second polarizing film to the second panel surface on the side in contact with the feed unit | 5 |
| Comparative Example 2 | Bonding a first polarizing film to the first panel surface on the side in contact with the feed unit | → | 90° rotation | Turnover | Bonding a second polarizing film to the second panel surface on the side in contact with the feed unit | → | Turnover | Bonding a reflective polarizing film to the first polarizing film on the side in contact with the feed unit | 9 |

In Example 1, after the rotation step, the reflective polarizing film was bonded to the first polarizing film, which was followed by bonding the second polarizing film to the second panel surface, and as a result, one piece was determined to have a defective appearance. On the other hand, in Comparative Example 1, after the rotation step, the second polarizing film was bonded to the second panel surface, which was followed by bonding the reflective polarizing film to the first polarizing film. As a result, four pieces were determined to have a defective appearance, due to dirt or dust suspended by the effect of the rotation so that contaminants were deposited between the liquid crystal panel and the second polarizing film. Therefore, the results in Example 1 and Comparative Example 1 show that when bonding was first performed on the panel surface on the side (floor side) in contact with the feed unit and then performed on the panel surface on the side (ceiling side) not in contact with the feed unit, the result was better in Example 1 where bonding the first polarizing film was followed by the rotation step and then by bonding the reflective polarizing film than in Comparative Example 1 where such a process was not used.

In Example 2, after the liquid crystal panel was turned over, the second polarizing film was bonded to the second panel surface, and as a result, five pieces were determined to have a defective appearance due to dirt or dust suspended by the effect of the turnover so that contaminants were deposited between the liquid crystal panel and the second polarizing film. On the other hand, in Comparative Example 2, after the rotation step, the liquid crystal panel was turned over, and then the second polarizing film was bonded to the second panel surface, which was followed by further turning over the liquid crystal panel and then by bonding the reflective polarizing film to the first polarizing film. As a result, relatively much dirt or dust was suspended for a relatively long time by the effect of the rotation and the turnover performed continuously, so that a poor result was obtained, in which nine pieces were determined to have a defective appearance due to contaminants deposited between the liquid crystal panel and the second polarizing film. Therefore, the results in Example 2 and Comparative Example 2 show that when bonding to the panel surface on the side (floor side) in contact with the feed unit was first performed and followed by turning over the panel surface on the side (ceiling side) not in contact with the feed unit and then by bonding to that panel surface, the result was better in Example 2 where bonding the first polarizing film was followed by the rotation step and then by bonding the reflective polarizing film than in Comparative Example 2 where such a process was not used.

What is claimed is:

1. A method for manufacturing a liquid crystal display device by feeding long carrier films from continuous rolls, respectively, wherein the continuous rolls comprise rolls of laminates comprising the long carrier films and pressure-sensitive adhesive carrying optical films each with a specific width placed on the carrier films, respectively, and by bonding the optical films, which are being peeled off or have been peeled off from the carrier films, respectively, to first and second panel surfaces of a liquid crystal panel, respectively, with the pressure-sensitive adhesive interposed therebetween so that the liquid crystal display device is obtained, the method comprising:

a first bonding step comprising bonding a first optical film to the first panel surface of the liquid crystal panel, wherein the first optical film has a transmission axis in its widthwise direction; then a rotation step comprising rotating by 90° the liquid crystal panel with the first optical film bonded to the first panel surface; then a second bonding step comprising bonding a second optical film to the first optical film on the first panel surface, wherein the second optical film has a transmission axis in a direction perpendicular to its widthwise direction and the transmission axis of the first optical film is parallel with the transmission axis of the second optical film and wherein the second optical film is bonded so that the transmission axis of the second optical film is parallel to the transmission axis of first optical film; and then a third bonding step comprising bonding a third optical film to the second panel surface of the liquid crystal panel with the first and second optical films bonded to the first panel surface, wherein the third optical film has a transmission axis in its widthwise direction and the transmission axis of the third optical film is perpendicular to the transmission axis of the first optical film and the second optical film.

2. The method according to claim 1, wherein in the first bonding step, the first optical film is bonded to the first panel surface on a side in contact with a liquid crystal panel feed unit, while the liquid crystal panel is fed, in the second bonding step, the second optical film is bonded to the first optical film on the first panel surface on a side in contact with the liquid crystal panel feed unit, while the liquid crystal panel is fed, and in the third bonding step, the third optical film is bonded to the second panel surface on a side not in contact with the liquid crystal panel feed unit, while the liquid crystal panel is fed.

3. The method according to claim 1, further comprising a turnover step comprising turning over the liquid crystal panel with the first and second optical films bonded to the first panel surface, which is performed between the second and third bonding steps, wherein in the first bonding step, the first optical film is bonded to the first panel surface on a side in contact with a liquid crystal panel feed unit, while the liquid crystal panel is fed, in the second bonding step, the second optical film is bonded to the first optical film on the first panel surface on a side in contact with the liquid crystal panel feed unit, while the liquid crystal panel is fed, and in the third bonding step, the third optical film is bonded to the second panel surface on a side in contact with the liquid crystal panel feed unit, while the liquid crystal panel is fed.

* * * * *